Feb. 4, 1969

R. B. COX 3,425,235

SOLVENT PURIFICATION

Filed May 26, 1955

INVENTOR.
ROBERT B. COX
BY
J. F. Cuneo
ATTORNEY

INVENTOR.
ROBERT B. COX
BY
J. F. Cuneo
ATTORNEY

United States Patent Office 3,425,235
Patented Feb. 4, 1969

3,425,235
SOLVENT PURIFICATION
Robert B. Cox, 1583 Palmer St., Pomona, Calif. 91766
Filed May 26, 1955, Ser. No. 511,228
U.S. Cl. 62—58              36 Claims
Int. Cl. B01d 9/04

This invention relates broadly to a method for purifying liquids containing solids dissolved therein, and in particular to a method for the purification of saline waters that contain appreciable amounts of dissolved salts, and to apparatus for carrying out the novel process; the process combining the principles of distillation and crystallization.

Many processes have been explored for the purification of saline waters by distillation. However, existing distillation processes, including multiple effect evaporation and the vapor compression process, require that all of the pure water produced by the process be first converted into vapor. This procedure requires extremely large heat transfer surfaces if any appreciable amount of water is to be produced. For example, to obtain 1000 g.p.m. of pure water by distillation would require a heat transfer of 500,000,000 B.t.u./hr. and, of necessity a large heat transfer surface. Because these distillation processes operate at elevated temperatures, the heat transfer surfaces are usually made of expensive alloys to enable the transfer surfaces to withstand the corrosive action of hot concentrated sea water.

An inherent difficulty encountered in all ordinary distillation processes for the production of pure water from saline waters, such as sea water, is the large quantities of salts, scale and other solid material that become deposited on the heat transfer surfaces in the form of dense, solid liners. The thicker the liner deposited on the heat transfer surface, the more difficult it becomes to transfer the heat to the liquid being evaporated and the result is an increasingly inefficient operation. To overcome this heat transfer energy loss it is necessary to shut down the units frequently and clean out the salts and scale. The cost involved in cleaning the units, the production lost during shutdowns, and the inefficient utilization of energy make the ordinary distillation processes impractical for low cost production of potable water from saline waters such as sea water.

While multiple effect evaporation has been used on a limited scale as a more efficient method for producing pure water from sea water, this process is also not too satisfactory economically since large heat transfer surfaces are required which, as described above, are subject to scaling, and furthermore it is necessary to lose the very large latent heat of vaporization in the last stage or effect.

The vapor compression process again requires that all the pure water produced be first converted to vapor before it is subjected to the compression process. The energy required for compressing the vapor alone is considerable, and when added to the equipment costs and other expenses does not result in an economical process for purifying large quantities of water. This is also a distillation process in which the metallic heat transfer surfaces are subject to scaling.

Pure water can be produced by freezing saline waters but such a method of obtaining pure water is not regarded as economically feasible and is scarcely ever used except where freezing occurs naturally. Adequate refrigeration units for carrying out such a process mechanically would be initially very expensive and even under optimum conditions the transfer of at least 71,000,000 B.t.u./hr. would be required to produce water at the rate of 1000 g.p.m. An inherent difficulty in such a method is the fact that the extensive heat transfer surfaces required to convert the water to ice soon become coated with ice, an excellent insulating material, which must be removed continuously from the surfaces if the efficiency of the heat transfer surfaces is not to be materially reduced; ice forming in this manner adheres to the surface tenaciously and can be removed only with great difficulty. Salt water also becomes entrapped within the layers of ice crystals in appreciable volume, especially when the thickness of the ice layer is substantial. This lowers the purity of the water produced since there is no satisfactory method for removing entrapped water from the ice layers.

It is a purpose of my invention to provide an improved, economical method and apparatus for producing pure water in large volumes from saline water such as sea water or brackish waters, at a cost which is lower than is possible by presently available methods and with a minimum expense for supervision, labor, and maintenance.

Another purpose of this invention is to provide an improved economical method for the purification of sea water, that can operate efficiently over long periods of time, wherein the deposition of salts, scale, etc. on the heat transfer surfaces of the equipment is reduced to a minimum.

Another purpose of my invention is to provide a process and apparatus for the purification of sea water that requires much smaller heat transfer areas than has heretofore been possible when water is to be produced in large volumes.

A further purpose of my invention is to provide a process and apparatus that is capable of substantially preventing corrosion from taking place at any heat transfer surface or other metal surfaces of the apparatus that come in contact with sea water, either in the raw form or after it has become concentrated.

An added purpose is to provide a purifier for sea water that is relatively compact in construction and can easily be installed at a low cost aboard ocean going vessels to provide fresh water normally required.

My invention incorporates only the best features of both the distillation and freezing processes in addition to novel applications thereof. The preferred process briefly comprises the following steps; Raw salt water such as sea water, is cooled by any suitable means to the temperature at which water having that particular salt content would normally freeze. The cooled salt water is introduced into an evaporator unit wherein the pressure is maintained sufficiently low to cause the cooled raw sea water to boil. The water vapor formed is ducted to a suitable separating apparatus where it is stripped of salt water droplets or fog entrained during the evaporation stage. The salt free vapor is now subjected to a compression process until the pressure of the vapor is raised to a point at least as high as the vapor pressure of water at 32° F. In the process of boiling, the vapor formed extracts its heat of vaporization from the remainder of the water. Since the water is already at the freezing point, the removal of additional heat causes a portion of the water to freeze into ice crystals. Each pound of vapor produces approximately seven pounds of ice crystals.

The ice crystals and concentrated salt water collect in the lower portion of the evaporating unit and are conducted to a separating unit. In this unit the ice crystals are removed from the concentrated salt water and are washed free of salt by a small amount of salt-free water. The purified ice crystals are then mixed with cold salt-free water to form a slurry and the slurry is pumped into a vacuum condenser where it comes in intimate contact with the compressed water vapor leaving the above mentioned compression process. Since the ice crystals melt at 32° F. and the compressed water vapor condenses at this temperature, the ice melts and the water vapor is condensed to form salt-free water which may be collected and stored.

The above objectives and description of the invention may be more clearly understood by referring to the detailed description and accompanying illustrative drawings in which.

In carrying out the process, salt water from a source such as for example the ocean is preferably permitted to enter a screen house 10 where the water becomes separated from large objects such as sticks, fish, seaweed, rocks, shells, etc. The water enters the screen house at the prevailing temperature of the ocean or collecting pond, which for example will be assumed to be 65° F. The water is pumped from the inside of the screen house by a suitable pumping means such as a centrifugal pump 11, preferably into a sand filter 12, which may be of the gravity type customarily employed for the purification of municipal waters. The sand filter removes fine dirt, bacteria, small organisms, and other fine solid material that was not excluded by the screen house.

In the event that the filtered raw sea water is found to contain appreciable amounts of dissolved gases, it is preferable to pass the filtered water through a vacuum deaerator 13 in order to remove as much dissolved gas as possible before subjecting the raw sea water to further treatment. This is particularly desirable since gases in solution not only interfere with the heat transfers that occur later in the process, but also constitute one of the principal causes of corrosion of metal parts, particularly steel or iron parts, used in various units of the equipment. Further, removal of any gas dissolved in the water, particularly oxygen, prevents the growth of plant and animal life, which if permitted to thrive in the system, soon fouls the heat transfer surfaces and conduits.

Figure 1:
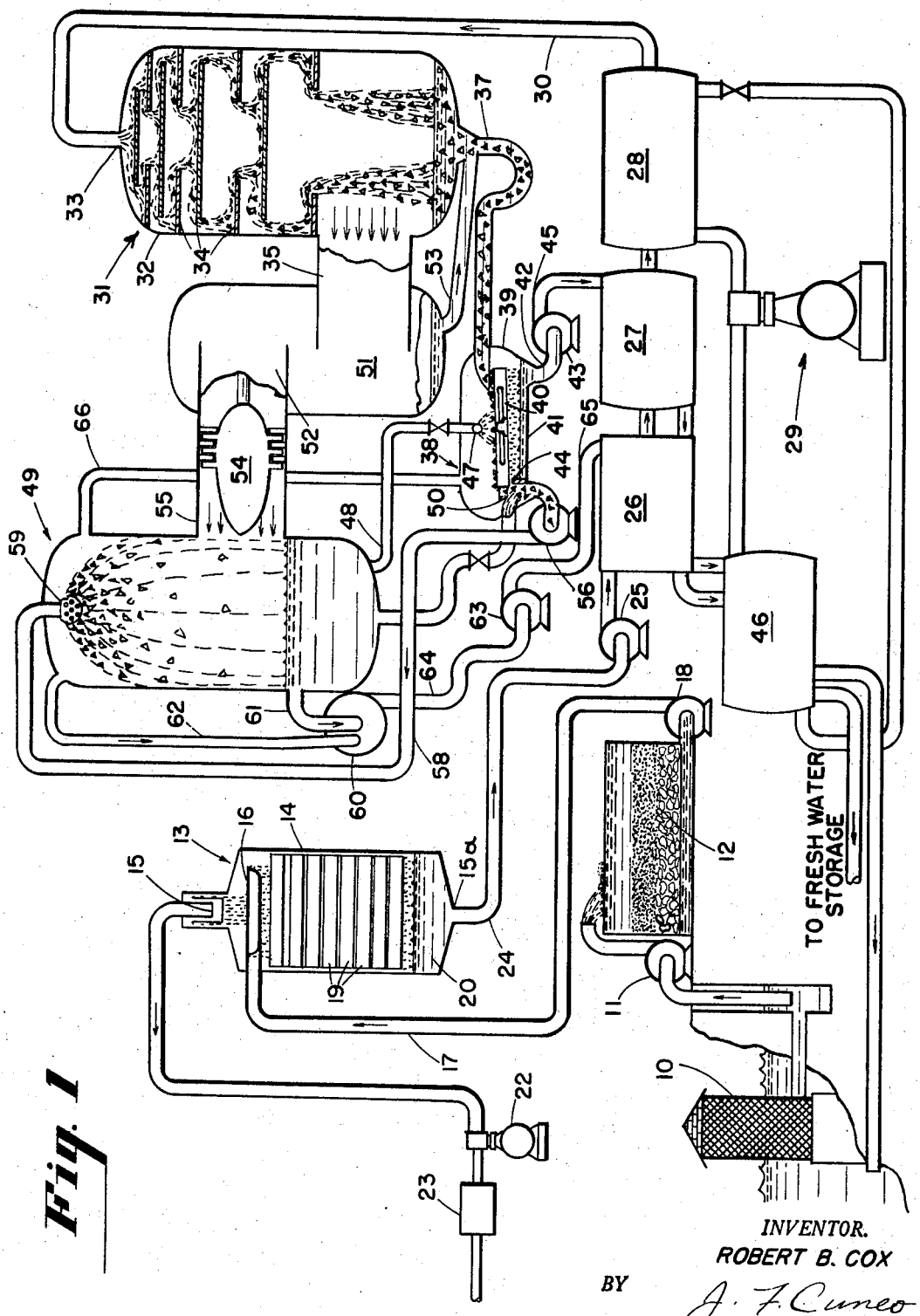
FIG. 1 is a schematic flow diagram of a preferred embodiment of the invention including partially schematic representations of the various units and equipment employed in carrying out the process.

A vacuum deaerator 13, shown in section in FIG. 1, comprises an enclosing container 14 provided with a vapor take-off 15 at its upper end and a liquid take-off 15a at its lower end. By use of a suitable pumping means, for example a centrifugal pump 18, raw filtered sea water is introduced into the deaerator through a conduit 17 which discharges onto a tray-shaped distributor 16. Directly below the distributing tray, and extending downwardly to a point near the lower portion 20 of the deaerator, are a plurality of wood slat bundles 19. These slats are preferably mounted horizontally and spaced to offer a maximum surface area and substantially fill the inner portion of the deaerator. The saline water spills over the sides of the distributing tray and trickles in thin layers over the slats of the slat bundles, thereby producing a large evaporating surface.

A source of vacuum, such as for example a mechanical vacuum pump 22 is connected to the vapor take-off 15 at the top of the deaerator. The vacuum pump reduces the pressure within the deaerator to the point where the water trickling over the slats is caused to boil. In the process of boiling all dissolved gases are liberated and a small quantity of water vapor is formed. These gases and the vapor are removed by the vacuum pump through the vapor take-off 15 which may be protected by a cup-shaped trap as indicated in the drawing. The trap removes any entrained droplets or water spray so that the vapor passing into the vapor take-off is essentially salt free. The compressed gas and vapor are discharged by the vacuum pump through a condenser 23 where the salt-free water vapor is condensed and collected for storage while the uncondensed gases are discharged to the atmosphere.

The portion of the water vaporized during boiling as it trickles over the slat bundles extracts its heat of vaporization from the remainder of the water, thereby lowering the temperature of the water. For example, if the temperature of the incoming saline water is 65° F., after degasing and partial vaporization the temperature may be reduced to 61° F. The filtered, deaerated and partially cooled sea water collects in the lower portion 20 of the deaerator from which it is removed through conduit 24 by a suitable pumping means, for example a centrifugal pump 25. The partially cooled sea water is discharged under pressure from pump 25 and is preferably conducted through one or more heat exchangers as desired. The temperature of the water is lowered still further in the heat exchanger or exchangers until it approaches the temperature at which the water will freeze.

Preferably the raw deaerated sea water passes through a first out-of-contact heat exchanger 26 where it is cooled by cold outflowing pure water produced later in the process and also by a separate out-of-contact stream of cold concentrated sea water leaving the system. For example the temperature of the raw sea water leaving heat exchanger 26 should preferably be about 39° F. The partially cooled raw sea water leaving first heat exchanger 26, is passed through a second out-of-contact heat exchanger 27 where it is cooled still further by outflowing concentrated sea water that is at a still lower temperature. The temperature of the raw sea water leaving heat exchanger 27 will preferably be about 34° F. These temperatures are cited only to illustrate the operation of the process. The actual temperatures at any preliminary stage of the process will depend on the initial temperature of the water entering from the ocean and the heat transfer areas involved.

The precooled raw sea water is preferably next passed through a refrigerating coil 28, cooled by suitable mechanical or other selected form of refrigeration, such as for example, an ammonia compression system 29. The temperature of the raw precooled sea water in passing through the coil 28 is lowered to the temperature at which the sea water drawn into the system will normally begin to freeze. This temperature for sea water having an average salt content has been taken to be about 28.7° F.

While the heat exchanger system described could be eliminated and the deaerated sea water could be cooled entirely by appropriate refrigerating coils, it is desirable to employ all means available that will economically reduce the temperature and thereby minimize the load on the refrigeration unit. Also the cooling of the water could be achieved by causing an appropriate portion of the water to evaporate under reduced pressure. The water while evaporating will extract heat from the remaining water and if evaporation is extensive enough would reduce the temperature of the remaining water to its freezing point.

The filtered, deaerated raw sea water which has been cooled to just its freezing point, is conducted through conduit 30 to an inlet opening 33 from which it is discharged into a high vacuum evaporator 31. High vacuum evaporator 31 comprises an enclosing shell 32 having an inlet opening 33 located at the upper end thereof. Within the vacuum evaporator, at successively lower levels, are a plurality of staggered shelves 34, for example, alternating annular and disc shelves may be used and arranged as in the drawings. These permit the chilled raw sea water to cascade over the alternating annular and discs shelves in relatively thin layers. The inner construction of vacuum evaporator 31 with its arrangement of staggered shelves is similar in construction to that employed in the so-called "disc flow" barometric condensers which are well known in the art. The pressure within vacuum evaporator 31 is preferably maintained at or slightly below a level corresponding to the vapor pressure at the freezing point of the concentrated sea water which is produced at this stage of the process. In the example shown above, this freezing point would be approximately 25.3° F. The vacuum may be attained by employing a vacuum pumping system such as is described later in the specification, or if preferred the proper degree of vacuum could be created by employing steam ejector pumps which are well known in the art and would be suitable where there is a large quantity of waste steam available.

As the cascading raw sea water flows over the plates at this reduced pressure, it boils vigorously and during its transformation into water vapor extracts heat equivalent to its heat of vaporization from the unvaporized water with which it is in contact. Since, as stated above, the temperature of the incoming raw sea water has been lowered to its freezing point, any further removal of heat from the water will cause a portion of this water to be converted into ice crystals. The removal of a part of the water as ice and as water vapor increases the concentration of the salt in the remaining water and this lowers the freezing point of the concentrated sea water so that it will remain liquid at the temperature in the evaporator. Approximately seven pounds of ice crystals are formed for each pound of water vaporized. In the example indicated above this will cause the sea water that remains neither frozen or vaporized to be concentrated about 50%. This evaporation and freezing process can be accomplished in one or more stages as desired. All heat transfer that takes place in vacuum evaporator 31 occurs without the agency of any metallic heat transfer surfaces since all heat transfer takes place at the surface of the liquid. Obviously such a heat transfer surface cannot become fouled.

Other methods of dispersing the liquid to increase the exposed surface thereof, while passing through the evaporator may be used, i.e., the liquid may be sprayed into the evaporator in the form of fine droplets or it may be introduced into the evaporator through vertical tubes located within the evaporator and the liquid permitted to flow over the tops of the tubes and run down the outer surface of each tube in the form of thin sheets of liquid.

The water vapor formed during the boiling of the sea water in vacuum evaporator 31, leaves the evaporator through conduit 35, preferably located at the side of the enclosing shell 32, and the ice crystals formed settle with the concentrated salt water to form a slurry which collects in the lower portion of the vacuum evaporater.

The vapor passing through conduit 35 as it is discharged from vacuum evaporator 31, although essentially pure water vapor, will sometimes contain finely divided droplets of salt water that become entrained by the vapor and should be removed. This is preferably accomplished by passing the water vapor containing salt water droplets through a centrifugal type of separator 51, of the conventional form and design frequently employed for separating steam from water droplets in boiler plants. In centrifugal separator 51, any salt water droplets are removed from the water and returned, preferably by gravity flow, through conduit 53 and mix with the concentrated salt water-ice mixture as it leaves the vacuum evaporator through discharge conduit 37 which drains the salt water-ice mixture from vacuum evaporator 31 and feeds the mixture to a separating unit 38, which will be described in detail later.

The purified water vapor leaving centrifugal separator 51 enters conduit 52, leading to a pressurizing device such as an axial flow or other suitable compressor 54, of conventional design, where it becomes compressed until the pressure of the water vapor is raised at least to a level that corresponds to the vapor pressure of pure water at 32° F., preferably to the vapor pressure of pure water at 34° F. Such an axial flow compresser should have a compression ratio equal to 1.38. Any desired form of motive power may be used to drive the compressor, i.e., an electric motor, steam turbine, internal combustion engine, etc. After the pressure on the water vapor has been increased, the vapor exits through a conduit 55 into vacuum condenser 49.

The vapor formed may also if desired be withdrawn from the evaporator at this stage of the process and condensed separately or it may be discarded.

Although the ice crystals and concentrated salt water may be separated before each is withdrawn from the evaporator by any appropriate means, preferably, the ice crystals and concentrated salt water mixture is drained from the evaporator through a conduit 37, as described above, and flows, preferably by the action of gravity into an enclosed separating unit 38, where the concentrated salt water and ice crystals are separated from each other. Separating unit 38, shown in the illustrations, by way of example only, comprises an outer enclosing shell 39 within which may be mounted a vibrating screen 40 of a type such as has been developed and is commonly employed in the chemical industry. A variety of shaking screens and similar devices are shown and described in "Chemical Engineers' Handbook" by Perry, 1950 edition, on pages 957 et seq.

For mechanical convenience, the pressure within the shell of separating unit 38 is maintained the same as that existing within vacuum condenser 49. A vent line 66 may be used to connect the upper portion of vacuum condenser 49 with enclosing shell 39. If preferred, the pressure within the separating unit 38 may be maintained at any other desired level.

The slurry consisting of ice crystals and concentrated salt water is discharged from conduit 37 onto vibrating screen 40. The concentrated salt water drains through the separator and collects in the lower portion of the separating unit designated as portion 41, where it passes through a conduit 42 into a suitable pumping means such as a centrifugal pump 43. Baffle 44 prevents the concentrated sea water from entering the forward portion of the separating unit. Pump 43 discharges concentrated sea water under pressure into conduit 45 which leads to out-of-contact heat exchangers 27 and 26 consecutively, where it can cool the raw incoming sea water as was previously indicated. Upon leaving the heat exchanger 26 the temperature of the concentrated sea water is still low enough to act as a cooling medium and is therefore permitted to flow through the coils of ammonia condenser 46 which is one of the elements of ammonia refrigerating system 28 described heretofore. From condenser 46 the concentrated sea water can be discharged to either a by-product recovery system if the dissolved material is to be recovered, or may be returned to its source.

The ice crystals retained on the screen are caused to travel the entire length of the screen, which should extend beyond baffle 44, by the vibratory motion. Prior to reaching baffle 44 the ice crystals preferably pass under salt free water sprays 47 and the ice is washed free of any salt or brine adhering to it. The salt free water of the spray is preferably supplied from vacuum condenser 49 through a conduit 48. As the ice and washed ice crystals are well below the temperature at which they would melt, and have become separated from the concentrated sea water, there is no tendency for them to agglomerate as they travel down the screen. The washings from the ice crystals may be added to the concentrated sea water separated from the crystals of ice and be discharged from the system with it through conduit 42, or, since this water would normally contain relatively small amounts of salt, it may be efficiently recycled to the vacuum evaporator.

Any other suitable means of separating the ice crystals from the concentrated sea water may be employed. For example the separation could be effected by gravity separation of the ice and concentrated salt water; by centrifugal means; or by employing a suitable filter press arrangement.

The ice crystals, after passing under the rinse water are discharged from the screen and drop into the forward portion 50 of separating unit 38. More cold, salt free water, preferably from vacuum condenser 49, is added to the crystals in forward portion 50 of unit 38, to form an ice-purified water slurry. This slurry is picked up by a suitable pumping unit 56, such as a centrifugal pump, and is discharged by the pump through a conduit 58 that leads the slurry to the upper portion of vacuum condenser 49 into which it is discharged preferably through a sprayer system 59. If desired, vacuum condenser 49 could be located directly beneath the forward portion 50 of the separating unit thereby permitting the ice crystals to drop by gravity into condenser 49.

The slurry sprayed into vacuum condenser 49, through sprayer 59, falls countercurrent to the rising, incoming compressed pure water vapor discharged into the vacuum condenser by axial flow compressor 54. Since the water vapor has been compressed to a level where its condensation temperature is above 32° F., for example 34° F. and the temperature of the ice crystals by this time will be raised to 32° F., the ice will melt and the vapor will be condensed into water thereby converting each into potable water that is collected in the bottom of vacuum condenser 49. It should be noted that all heat transfer that occurs in this unit takes place at the interface between water and ice and water vapor and therefore does not require any metallic heat transfer surfaces.

The inner construciton of the vacuum condenser could also be similar to that of the evaporator unit, that is it could employ alternating discs and annuli permitting the ice slurry to discharge on the alternating shelves thus offering prolonged contact with the rising vapor. The vertical tube construction mentioned in the evaporator unit could also be used, the slurry feeding into the bottom of the tubes and overflowing the top edge of the tubes and running down the outer sides in a thin layer flowing countercurrent to the rising incoming water vapor.

The vacuum in condenser unit 49, and therefore in vacuum evaporator 31 and in separating unit 38, if this is connected directly to condenser 49, is maintained by a suitable vacuum source 60, preferably a hurling water type of vacuum pump of the type used in connection with steam condensers. One form of such pump is shown and described in "Steam Power Plant Auxiliaries and Accessories" by Croft, published by McGraw Hill Book Co., Inc., 1946 edition, on page 385. A portion of the purified water that collects in the lower portion of vacuum condenser 49 is utilized to operate the hurling water vacuum pump and is supplied to pump 60 by a conduit 61. Any water vapor that does not condense in vacuum condenser 49 is eventually drawn into the hurling water vacuum pump through conduit 62 that connects the upper portion of vacuum condenser 49 to pump 60. The water vapor is mixed with and compressed by the water flowing in the pump and will eventually become condensed. The cold water leaving the hurling water vacuum pump is led by conduit 64 to a suitable pumping means 63, such as a centrifugal pump.

Pump 63 delivers salt free cold water under pressure through conduit 65, to out-of-contact heat exchanger 26, where it can absorb heat from the incoming sea water. The pure water leaving heat exchanger 26 passes next through the coils of an ammonia condenser, if one is used, where it absorbs heat from the ammonia. The principal portion of the water leaving the condenser is collected in a purified water storage tank (not shown).

Figure 2:
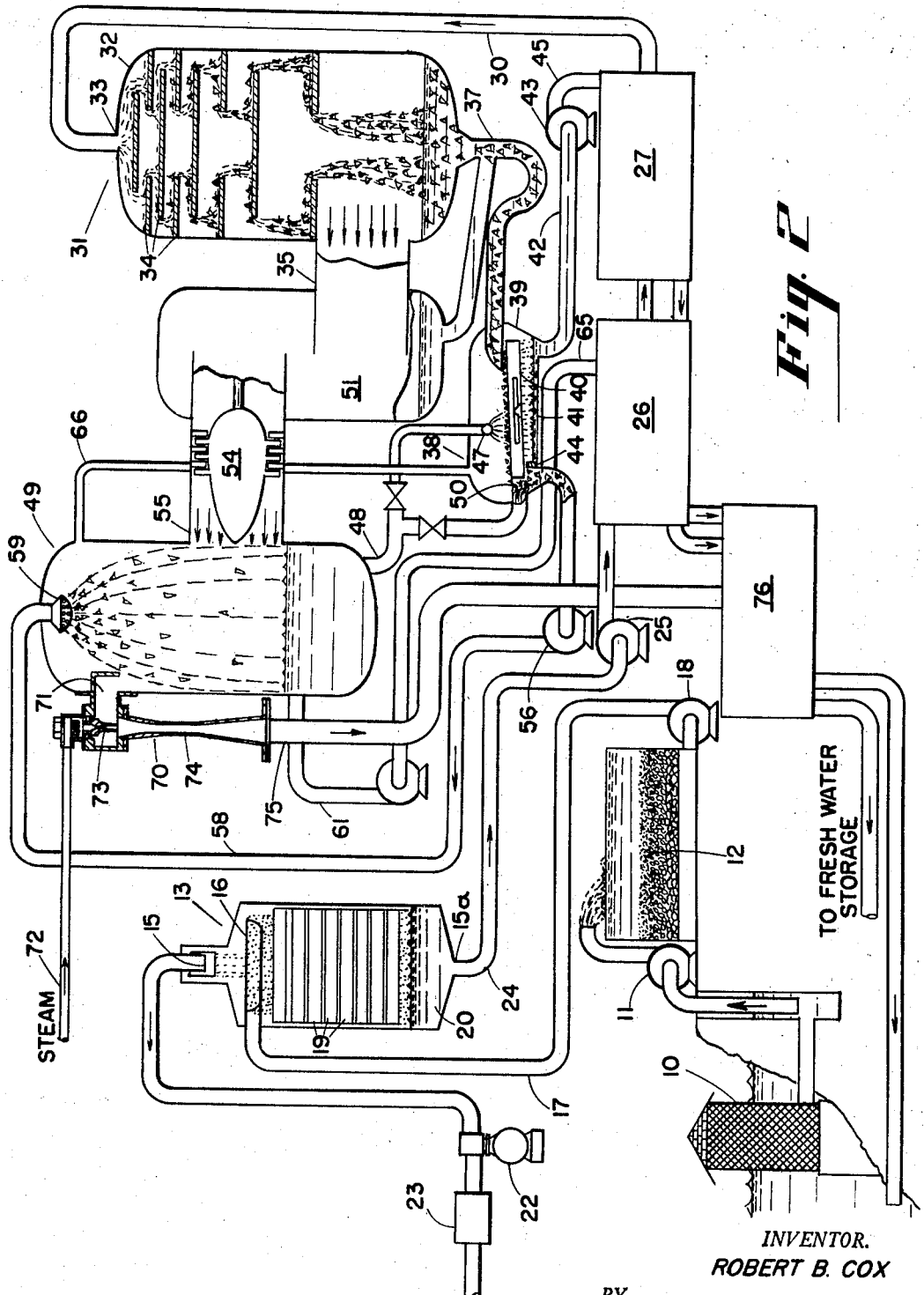
FIG. 2 is a schematic flow diagram of another alternative embodiment of the units and equipment used in purifying the salt-containing liquid.

The vacuum in condneser 49 and evaporator 31 may be produced and maintained by any other suitable means. For example FIG. 2 shows a steam ejector pump 70 having the intake 71 connected to the upper portion of condenser 49. More than one steam ejector pump may be used if necessary. The steam ejector pump is connected to a steam line 72 that supplies the operating medium. The steam passes through venturi 73 and entrains gas that is in the system discharging the steam and gas through a second venturi 74. The steam and gas then enter discharge conduit 75 which leads the steam and gases to an out-of-contact heat exchanger 76 where the steam and any unconverted water vapor are condensed into water. This water may be added to the water produced by the system since it would also be substantially free of salt or dissolved substances.

The schematic flow diagram of a recovery system such as shown in FIG. 2 resembles that of the process outlined and shown in FIG. 1, with the exception that the source of vacuum for the system is different and that no ammonia refrigeration unit is included to lower the temperature of the incoming raw sea water. In this modification of my invention the raw sea water is cooled to the proper degree by causing a portion of the water to boil at reduced pressure. The water on boiling extracts heat corresponding to its latent heat of vaporization, from the remaining water and thereby lowers the temperature of the remaining water. When sufficient heat has been absorbed from the water, a portion of the water will freeze and in doing so will increase the saline content of the remaining water. Once the system is in operation heat exchangers 26 and 27 will assist in lowering the temperature of the incoming raw sea water prior to its introduction into vacuum evaporator 31.

Separating unit 38 which separates the ice crystals from the concentrated esa water is again shown for convenience as a vibrating screen mechanism as in FIG. 1. It is intended that any other suitable separating means such as a gravity separator, centrifuge, filter or other adequate separating means may be substituted for the vibrating or shaking screen device.

Since the majority of the steps in the process occur at relatively low temperatures, the units such as the vacuum evaporator, centrifugal separator, compressor, separating unit, vacuum condenser, heat exchangers and connecting conduits as well as the pumping means, should be well insulated to prevent heat from the atmosphere from entering the system and interfering with the process.

A particular feature of this invention is that no metallic heat transfer surfaces are required or employed either to evaporate the raw sea water or to condense the vapor to form the purified water. All heat transfer that is required in producing the water vapor, condensing the water vapor or forming or melting the ice, occurs at the surface of the water, the surface of the ice or the surface of the water vapor. The absence of metallic heat transfer surfaces in the vacuum evaporator or the vacuum condenser is particularly desirable since this makes the possibility of fouling the units practically nonexistent.

The tendency of metal parts to corrode is also minimized since the process takes place at low temperatures. It is well recognized that the corrosive action of sea water increases rapidly as the temperature is increased. Corrosion also is greatly increased and assisted by the presence of dissolved oxygen in the water; since in my process the water is preferably deaerated before it is introduced into the principal units of the system, whenever it contains appreciable amounts of dissolved gases, this cause of corrosion is reduced to a minimum. The removal of oxygen also inhibits the growth of algae or other animal organisms since both must have oxygen to survive.

The process also maintains the concentration of the sea water at a level where neither scale or salt will have a tendency to separate from the solution and become deposited; this effectively reduces the necessity of frequent cleanups such as are necessary in other processes, and the cost of maintenance is reduced to a minimum.

Since the ratio of water vapor to ice formed in the vacuum evaporator is about seven parts of ice to one of water vapor, only a small amount of energy will be required during the compression stage to pressurize the water vapor formed in the evaporator.

The process described may also be employed in reverse, that is, the concentration of the solid material dissolved in the solvent liquid may be increased by removing a substantial portion of the solvent making it easier to recover the solid ingredient.

Various alterations may be made in the apparatus used in carrying the various steps in the process without departing from the scope of the present invention as defined by the following claims.

I claim:

1. In a water solution containing salts dissolved therein, the method of purifying the water which comprises: deaerating the raw salt solution by subjecting the raw salt solution to a pressure sufficiently low to remove gases contained in the raw salt solution; vaporizing a portion of the deaerated salt solution at a pressure sufficiently low to produce ice crystals in the remaining aqueous salt water solution; removing the resulting water vapor; compressing the water vapor to a pressure sufficiently high to permit it to condense when placed in heat exchange relationship with the ice crystals; removing the mixture of ice crystals and remaining aqueous salt solution; separating the ice crystals from the remaining aqueous salt solution; and bringing the separated ice crystals into direct heat exchange relationship with the compressed water vapor.

2. In a water solution containing salts dissolved therein, the method of purifying the water which comprises: vaporizing a portion of the water in the solution in a low pressure zone at a pressure sufficiently low to produce ice crystals in the remaining aqueous salt water solution; removing the resulting water vapor from said low pressure zone; compressing the water vapor to a pressure sufficiently high to permit it to condense when placed in heat exchange relationship with the ice crystals; removing the mixture of ice crystals and remaining aqueous salt solution from the said low pressure zone; separating the ice crystals from the remaining aqueous salt solution; washing the separated ice crystals free of salt water; and discharging the separated ice crystals into the compressed water vapor.

3. Apparatus for the purification of water having salts dissolved therein which comprises: a deaerator chamber; means associated with the deaerator chamber for lowering the pressure therein to a predetermined level; means for introducing raw salt solution into the deaerator chamber from a supply source; an evaporator chamber; the discharge from said deaerator chamber being connected to said evaporator chamber; means associated with said evaporator chamber for lowering the pressure therein to a predetermined level; means adapted to withdraw water vapor formed in the evaporator chamber and adapted to place said vapor under higher pressure, the inlet to said withdrawing and compressing means being connected to the evaporator chamber; a condenser chamber, the discharge from said withdrawing and compressing means discharging into said condenser chamber; separating means adapted to separate the ice crystals formed in the evaporator chamber from the residual salt solution; means for withdrawing separated salt solution from the separating means; means for transferring the ice crystals from the separating means and discharging the same into the condenser chamber; and means for withdrawing purified water from the condenser chamber.

4. An apparatus according to claim 3 wherein the deaerator chamber is provided with means for increasing the exposed surface of the salt water solution introduced into the chamber of the deaerator.

5. In a liquid solution having solids dissolved therein the method of separating the solvent from the dissolved solids which comprises: vaporizing a portion of the solvent in a low pressure zone at a pressure sufficiently low to produce solvent crystals in the remaining solution, removing the resulting solvent vapor from said low pressure zone, compressing the solvent vapor to a pressure sufficiently high to permit it to condense when placed in heat exchange relationship with the solvent crystals, removing a mixture of solvent crystals and concentrated solution from said low pressure zone, separating the solvent crystals from the concentrated solution, washing the separated solvent crystals free of solution, and placing said solvent crystals in direct heat exchange relationship with the said compressed solvent vapor.

6. A method according to claim 5 which includes cooling the solution to be separated.

7. A method according to claim 6 wherein the said solution is cooled to approximately but not below its freezing point.

8. A method according to claim 5 in which the said solution is dispersed within the low pressure zone to increase the exposed surface thereof.

9. A method according to claim 5 in which any dissolved gases contained in the solution to be separated are removed from the said solution.

10. A method according to claim 5 in which any excess solvent vapor not required to melt the solvent crystals is removed from the condensation zone.

11. A method according to claim 5 in which any entrained solution is separated from the solvent vapor prior to the removal of said solvent vapor from the said low pressure zone.

12. A method according to claim 5 which includes increasing the exposed area of said solvent crystals in heat exchange relationship with said compressed solvent vapor.

13. In a water solution containing salts dissolved therein, the method of purifying the water which comprises: vaporizing a portion of the water in the solution in a low pressure zone at a pressure sufficiently low to produce ice in the salt water solution, removing the resulting water vapor from said low pressure zone, compressing the water vapor to a pressure sufficiently high to permit it to condense when placed in heat exchange relationship with the ice, removing a mixture of ice and concentrated aqueous salt solution from the said low pressure zone, separating the ice from the concentrated aqueous salt solution, washing the separated ice free of salt water, and placing said ice in direct heat exchange relationship with said compressed water vapor.

14. A method according to claim 13 which includes cooling the solution to be separated.

15. A method according to claim 14 wherein the said solution is cooled to approximately but not below its freezing point.

16. A method according to claim 13 in which the said solution is dispersed within the low pressure zone to increase the exposed surface thereof.

17. A method according to claim 13 in which any dissolved gases contained in the solution to be separated are removed from the said solution.

18. A method according to claim 13 in which any excess water vapor not required to melt the ice crystals is removed from the condensation zone.

19. A method according to claim 13 in which any entrained solution is separated from the water vapor prior to the removal of said water vapor from the said low pressure zone.

20. A method according to claim 13 wherein the resultant purified water is brought into out of contact heat exchange relationship with the incoming raw salt containing water solution.

21. A method according to claim 13 wherein the resultant concentrated aqueous salt solution is brought into out of contact heat exchange relationship with the incoming raw salt containing water solution.

22. A method according to claim 13 wherein gravitational forces are utilized in effecting the separation of ice and salt solution.

23. A method according to claim 13 wherein the water condensate is used to wash the ice.

24. In a water solution containing salts dissolved therein, the method of purifying the water which comprises: vaporizing a portion of the water in the solution at a pressure sufficiently low to produce ice crystals in the remaining aqueous salt solution; removing the resulting water vapor; compressing the water vapor to a pressure sufficiently high to permit it to condense when placed in heat exchange relationship with the ice crystals; removing the mixture of ice crystals and remaining aqueous salt solution; separating the ice crsytals from the remaining aqueous salt solution; adding salt free water to the separated ice crystals and washing them free of salts; adding salt free water to the washed ice crystals to form an ice crystal-water slurry; and bringing the said ice crystal-water slurry into direct heat exchange relationship with the compressed water vapor.

25. Apparatus for the treatment of solvent solutions having solids dissolved therein which comprises:
  (a) means for vaporizing a portion of the solvent in the solution in a low pressure zone at a pressure sufficiently low to produce solvent crystals in the remaining solution;
  (b) means for removing solvent vapor from the said low pressure zone;
  (c) means for compressing the solvent vapor to a pressure sufficiently high to permit it to condense when placed in heat exchange relationship with the solvent crystals;
  (d) means for removing a mixture of solvent crystals and solvent solution from the said low pressure zone;
  (e) means outside the low pressure zone for separating solvent crystals from solvent solution;
  (f) means for washing separated solvent crystals free of solvent solution; and
  (g) means for placing separated solvent crystals and compressed solvent vapor in direct heat exchange relationship.

26. Apparatus according to claim 25 in which means are provided for removing non-condensible gases from said means for placing separated crystals and vapor in heat exchange relationship.

27. Apparatus according to claim 25 in which means are provided for adding pure solvent to separated solvent crystals.

28. Apparatus according to claim 25 in which means are provided for increasing the exposed surface of solvent and solvent crystals within said means for placing separated crystals and vapor in heat exchange relationship.

29. Apparatus according to claim 25 in which means are provided within said low pressure zone for increasing the surface area of the solution therein.

30. Apparatus according to claim 25 wherein said separation means utilizes gravitational forces to separate solvent crystals from solution.

31. Apparatus according to claim 25 wherein degasification means is provided for removal of gases from said solution.

32. Apparatus according to claim 25 wherein cooling means is provided for cooling the solution prior to its introduction into the low pressure zone.

33. Apparatus according to claim 25 wherein means is provided for removing excess uncondensed solvent vapor from said low pressure zone.

34. Apparatus according to claim 25 wherein means is provided for removing entrained solution from the solvent vapor.

35. Apparatus according to claim 25 wherein said low pressure zone includes baffle means therein disposed to promote the formation of solvent crystals by providing controlled circulation of the solution.

36. Apparatus for the treatment of water solutions having salts dissolved therein which comprises:
  (a) means for vaporizing a portion of the water in an aqueous salt solution in a low pressure zone at a pressure sufficiently low to produce ice crystals in the remaining aqueous salt water solution;
  (b) means for removing water vapor from the said low pressure zone;
  (c) means for compressing the water vapor to a pressure sufficiently high to permit it to condense when placed in heat exchange relationship with the ice crystals;
  (d means for removing a mixture of ice crystals and aqueous salt solution from the said low pressure zone;
  (e) means outside the low pressure zone for separating ice crystals from aqueous salt solution;
  (f) means for washing separated ice crystals free of salt water solution; and
  (g) means for placing separated ice crystals and compressed water vapor in direct heat exchange relationship.

References Cited

UNITED STATES PATENTS

| | | | |
|---|---|---|---|
| 1,576,136 | 3/1926 | Johnson | 62—124 |
| 1,713,934 | 5/1929 | Thoens | 62—169 |
| 1,865,614 | 7/1932 | Caldwell | 62—152 |
| 1,931,347 | 10/1933 | Gay | 62—124 |
| 2,259,841 | 10/1941 | Spiegl | 62—58 |
| 2,315,762 | 4/1943 | Ax et al. | 62—124 |
| 2,383,174 | 8/1945 | Weir | 62—124 |
| 2,419,881 | 4/1947 | Borgerd et al. | 62—124 |
| 2,436,218 | 2/1948 | Malcolm | 62—124 |
| 2,438,368 | 3/1948 | Keeling | 62—124 |
| 2,448,802 | 9/1948 | Holzcker | 62—124 |
| 2,477,959 | 8/1949 | Brown | 62—124 |
| 2,515,098 | 7/1950 | Smith | 62—124 |
| 2,521,751 | 9/1950 | Sampson et al. | 62—152 |
| 2,585,021 | 2/1952 | Lessard et al. | 62—124 |
| 2,619,453 | 11/1952 | Andersen | 202—75 |
| 2,666,304 | 1/1954 | Ahrel | 62—58 |
| 2,683,178 | 7/1954 | Findlay | 62—124 |
| 2,735,779 | 2/1956 | Wenzelberger | 62—124 |
| 2,764,488 | 9/1956 | Slattery | 62—123 |

FOREIGN PATENTS

| | | |
|---|---|---|
| 70,507 | 6/1946 | Norway. |
| 105,539 | 9/1941 | Sweden. |
| 985,905 | 7/1951 | France. |

NORMAN YUDKOFF, *Primary Examiner.*

U.S. Cl. X.R.

23—273; 203—11; 202—205